Figure 1:
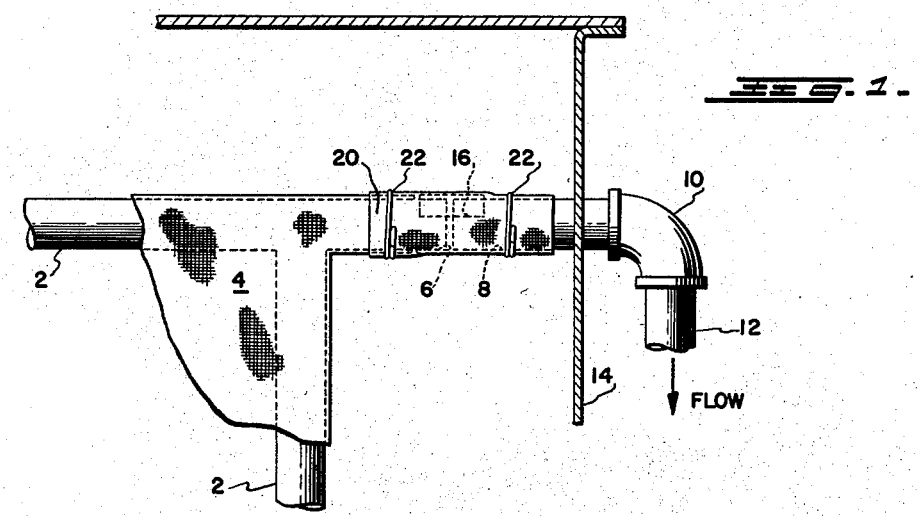

March 24, 1959

M. A. JOHNSON 2,878,941

FILTER APPARATUS

Filed July 8, 1955

INVENTOR
MARTIN A. JOHNSON

BY James E. Tooney

ATTORNEY

United States Patent Office 2,878,941
Patented Mar. 24, 1959

2,878,941

FILTER APPARATUS

Martin A. Johnson, Baton Rouge, La., assignor to Kaiser Aluminum & Chemical Corporation, Oakland, Calif., a corporation of Delaware Application July 8, 1955, Serial No. 520,720

5 Claims. (Cl. 210—346)

The present invention relates to a pipe coupling and more particularly to an improved threadless type pipe coupling with a filter cloth covering.

The instant coupling has been found to be advantageously employed in connection with filtering apparatus utilized in the heavy chemical industries. One particular type of filtering apparatus which is readily adapted for the use of the instant invention is the pressure filter originally designed by David J. Kelly for use principally in the cyanide process for recovering precious metals from their ores. Filter presses of this particular type are described in U.S. Patents 815,021 and 864,308 and generally include a stationary cylindrical filter tank into which a plurality of canvas covered rectangularly shaped foraminous leaves are inserted on a filter carrier. The carrier provides a supporting means for the filter elements or leaves and a convenient means for removing same from the tank for filter cake discharge, as well as for changes in the filter medium. The liquid containing suspended solid matter is pumped into the filter tank, usually under high pressures, wherein the cake deposits on both sides of the leaves. The filtrate is removed from the tank after passing through the hollow frame members of the filter leaves. The filter leaves are usually of rectangular configuration when viewed from the side and have means associated therewith for firm placement on the carrier and for proper spacing thereof one from the other.

The herein described invention is directed to a novel threadless coupling device employed in connection with filtering apparatus mentioned above where the pressure on the outer surface of the coupling is greater than the pressure on the inner surface of the coupling.

Attempts have been made to overcome the scaling problems inherent in apparatus employed in the heavy chemical industries in connection with the couplings used for connecting the press leaf discharge nipples of the hollow frame members of the filter leaves which are adapted to form a passage for the discharge of the filtrate from the system. In each attempt to solve the scaling problem, the couplings developed were unsatisfactory due to a hard scale formation thereon causing a restriction of the internal conduit passage and a like scale formation on the outer surface. In such instances, the filtering apparatus had to be shut down in order to disconnect and replace the couplings. Most of the time the coupling and pipe nipples were damaged or destroyed during the process of disconnecting which made it necessary to frequently install a completely new coupling. Due to this condition, there were frequent periods of several hours of maintenance work to disconnect and replace the damaged couplings.

Some of the previous couplings of the threaded type employed in connection with filtering apparatus were characterized by a restricted interior passage. The restricted zone of these couplings aggravated the problem created by scale formation by increasing the rapidity with which reduced liquor flow took place. Also, due to the scaling conditions and the design of the previous couplings, it was difficult to maintain a tight seal on the press leaf couplings. Manifestly, if the press leaf couplings were not properly sealed, impurities would seep through the openings and contaminate the clean filtrate.

With the knowledge of these obvious disadvantages, this invention produces a novel coupling which eliminates the use of threaded nipples and eliminates the scaling problem which was experienced by the other couplings known in the art.

Figure 2:
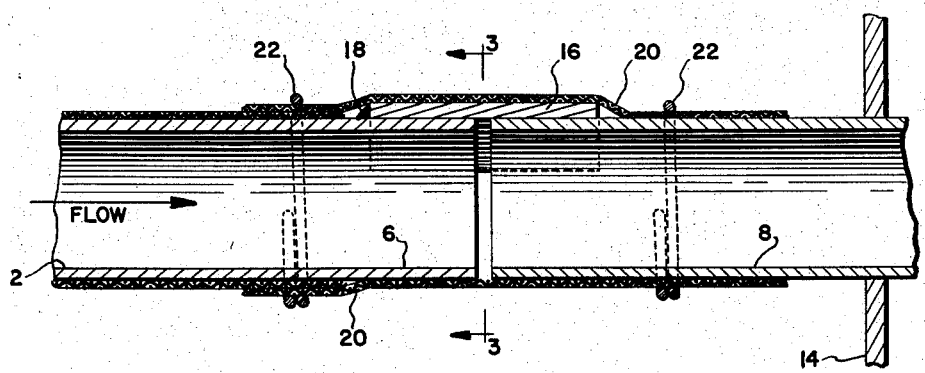
Figure 3:
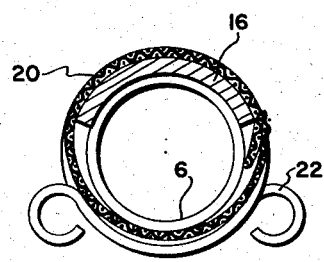

The novel coupling and associated advantages will be readily understood with reference to the following description read in conjunction with the accompanying drawings in which Figure 1 is a view of the coupling device of the instant invention showing a portion of the system in which the device may be utilized, Figure 2 is a cut-away view of the coupling of the instant invention, and Figure 3 is a sectional view of the coupling taken along line 3—3 of Figure 2.

With particular reference to Figures 1 and 2, a filter press leaf element partially shown (Fig. 1) comprises a hollow frame member 2 having an interior wire mesh screen with a cloth cover 4 tightly wrapped around the exterior surface thereof. The filter press frame member 2 is provided with an outwardly extending discharge nipple 6 which is adapted to act as a discharge conduit for filtrate. In close proximity and in co-axial relation, there is disposed a filter press head nipple 8 which is rigidly mounted in seal-tight relation within an aperture formed in the shell wall 14 of a filter press, such as for example a Kelly filter. The terminus of the filter press head nipple 8 disposed on the outside of the shell wall 14 is coupled to a pipe or conduit 12, which leads to a filtrate header (not shown), through an L-shaped union 10.

The discharge nipple 6 of the filter press leaf frame 2 is provided with a metallic semi-cylindrical segment or strap 16. The preferred relative size of the strap 16 is shown in the section view of Figure 3. It will be noted that the strap 16 is rigidly affixed to the discharge nipple 6 by means of a butt weld 18 shown in Figure 2. It is readily discernible that the strap 16 being rigidly affixed to the discharge nipple 6 functions to support the weight of one end of the filter press leaf frame 2 on the nipple 8 which is rigidly secured to the shell wall 14. Additionally, the strap 16 maintains the desired alignment between the discharge nipple 6 and the press head nipple 8 thereby forming an unobstructed conduit path for filtrate passage therethrough.

To prevent any unfiltered solutions from seeping into the discharge flow of the clean filtrate through the system, there is provided a filter cloth cover 20 which is caused to completely envelope the adjacent terminal portions of the discharge nipple 6 and the press head nipple 8. Manifestly, the cover 20 likewise covers the strap 16, and a portion of the filter press leaf cloth cover 4 which extends to a point close to the terminal portion of the discharge nipple 6. The filter cloth cover is retained in fixed position relative to the nipples 6 and 8 by a pair of wire clamps 22 which are adapted to surround and tightly engage the filter cover 20 on opposite sides of the strap 16.

It must be understood that an alternative arrangement of the individual elements of the device can be accomplished without avoiding the spirit of the instant invention. Such an alternative arrangement contemplates welding or otherwise affixing the member 16 to the bottom of the filter press head nipple 8, rather than welding the member 16 to the discharge nipple 6 as shown in Figures 1 and 2. In the suggested alternative, the member 16 would likewise support the load of the filter press leaf elements comprised of the hollow frame members 2 as in the embodiment described hereinabove.

The disadvantages of the prior art couplings have been greatly reduced by the instant coupling. The advantages inherent in the devices include the substantial decrease in the down-time necessary to install or clean the filter press leaves of a Kelly type filter, the elimination of threaded members previously employed as coupling members, the provision of a filtering cover eliminates the necessity for the coupling joint to be tight or leak proof because any liquid leaking through the coupling is filtered, eliminates the necessity for the employement of gaskets and machined joint fittings, and many other advantages clearly evident to those persons skilled in the art.

In conclusion, it is self evident, that the invention has produced a coupling of the threadless type which is readily and economically manufactured and easily installed and maintained.

Various modifications of the coupling described hereinabove can be accomplished without avoiding the scope of the invention as pointed out in detail in the appended claims. Such modifications could be, for example, in the means employed for securing the filter cloth cover to the coupling. Any suitable engaging or fastening means could be employed. Likewise, the filter cloth cover could be formed of a cotton material, such as for example, canvas duck or could be fabricated of a metal gauze or the like.

What is claimed is:

1. In a filter apparatus having a plurality of filter press leaves and framework formed of hollow frame members comprising discharge conduits for filtrate housed within a vessel, the improvement comprising means for butt coupling the terminal portions of said discharge conduits to their respective conduits leading through said vessel wall unobstructed liquid passageways including a rigid arcuate strap member affixed to the terminal portion of said discharge conduit extending beyond the terminal portion of said discharge conduit in overlapping position relative to said conduit leading through said vessel wall, a filter cloth cover completely encircling the terminal portions of said conduits and said rigid arcuate strap member, and means for fastening said cloth cover to the terminal portions of said conduits.

2. A combined threadless coupling device with a filter element for butt coupling two conduits together to form an unobstructed liquid passageway, comprising a first and second conduit, an arcuate strap member rigidly affixed to and extending beyond the terminal portion of said first conduit to an overlapping position with respect to said second conduit, a filter element completely encircling the terminal portions of said first and second conduits and said arcuate strap member, and means tightly engaging said filter element for militating against any movement of said filter element relative to said conduits.

3. A combined threadless pipe coupling with a filter cloth cover for butt coupling two pipes together to form an unobstructed liquid passageway, comprising a first and second pipe, a rigid arcuate strap member affixed to the terminal portion of said first pipe, said rigid arcuate strap member extending beyond the terminal portion of said first pipe to a position overlapping the terminal portion of said second pipe, a filter cloth cover completely encircling the terminal portions of said first and second pipe and said rigid arcuate strap member, and fastening means for positively securing said cover to said first and second pipes.

4. A filter apparatus comprising at least one filter press leaf containing a discharge conduit, a respective second conduit leading through a wall of said filter apparatus, a combined threadless coupling device with a filter element for butt coupling together said discharge conduit and said second conduit to form an unobstructed liquid passageway, comprising an arcuate strap member rigidly affixed to and extending beyond the terminal portion of one of said conduits to an overlapping position with respect to the other of said conduits, a filter element completely encircling the terminal portions of said discharge and said second conduits and said arcuate strap member, and means tightly engaging said filter element for militating against any movement of said filter element relative to said conduits.

5. The filter apparatus of claim 4 wherein the said arcuate strap member is rigidly affixed to said discharge conduit.

References Cited in the file of this patent

UNITED STATES PATENTS

| | | |
|---|---|---|
| 756,375 | Kathol | Apr. 5, 1904 |
| 842,764 | Burt | Jan. 29, 1907 |
| 1,072,111 | Garred | Sept. 2, 1913 |
| 2,240,411 | Newman | Apr. 29, 1941 |